(12) United States Patent
Tramoni

(10) Patent No.: US 11,764,830 B2
(45) Date of Patent: Sep. 19, 2023

(54) ADJUSTMENT OF AN ACTIVATION TIME OF A CIRCUIT

(71) Applicant: STMicroelectronics (Rousset) SAS, Rousset (FR)

(72) Inventor: Alexandre Tramoni, Le Beausset (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 184 days.

(21) Appl. No.: 17/499,371

(22) Filed: Oct. 12, 2021

(65) Prior Publication Data

US 2022/0149894 A1  May 12, 2022

(30) Foreign Application Priority Data

Nov. 12, 2020 (FR) ...................................... 2011621

(51) Int. Cl.
*H04B 5/00* (2006.01)
(52) U.S. Cl.
CPC ......... *H04B 5/0025* (2013.01); *H04B 5/0031* (2013.01); *H04B 5/0037* (2013.01)
(58) Field of Classification Search
CPC ... H04B 5/0025; H04B 5/0031; H04B 5/0037
USPC ........................................................ 307/104
See application file for complete search history.

(56) References Cited

U.S. PATENT DOCUMENTS

| 10,164,766 | B1* | 12/2018 | Hung ..................... H03L 7/085 |
| 2009/0184777 | A1 | 7/2009 | Fagg et al. |
| 2013/0169369 | A1 | 7/2013 | Turner et al. |
| 2014/0370803 | A1 | 12/2014 | Haverinen et al. |
| 2016/0156232 | A1 | 6/2016 | Joye et al. |
| 2016/0248468 | A1 | 8/2016 | Greiner et al. |
| 2017/0085457 | A1* | 3/2017 | Huang .............. H04W 52/0216 |
| 2019/0372577 | A1 | 12/2019 | Yehezkely |
| 2020/0136629 | A1 | 4/2020 | Kirschner |
| 2021/0226668 | A1* | 7/2021 | Cordier ................ H04B 5/0081 |
| 2022/0149893 | A1* | 5/2022 | Tramoni ................ H04B 17/11 |

FOREIGN PATENT DOCUMENTS

| CN | 101657967 A | 2/2010 |
| CN | 103187969 A | 7/2013 |
| CN | 103684535 A | 3/2014 |
| CN | 105308874 A | 2/2016 |
| CN | 111106831 A | 5/2020 |

* cited by examiner

*Primary Examiner* — William Hernandez
(74) *Attorney, Agent, or Firm* — Slater Matsil, LLP

(57) ABSTRACT

An embodiment of the present description concerns a method wherein a time of beginning of a periodic step of activation of a near-field communication circuit of a first device, charged in near field by a second device, is adjusted according to a frequency of an electromagnetic field emitted by the second device.

22 Claims, 3 Drawing Sheets

ADJUSTMENT OF AN ACTIVATION TIME
OF A CIRCUIT

CROSS-REFERENCE TO RELATED
APPLICATIONS

This application claims the benefit of French Application No. 2011621, filed on Nov. 12, 2020, which application is hereby incorporated herein by reference.

TECHNICAL FIELD

The present disclosure generally concerns electronic devices and methods. The present disclosure more particularly concerns electronic devices integrating a near-field communication circuit (NFC), more commonly called NFC devices, and near-field charge methods likely to be implemented by such devices.

BACKGROUND

In addition to methods of near-field data exchange between NFC devices, methods of near-field power transfer aiming at charging a NFC device with another NFC device are known. Existing method of near-field charge of a NFC device by another NFC device however turn out having a low performance, their implementation causing, in particular, significant charge durations.

SUMMARY

There is a need to improve existing methods of near-field charge of a NFC device by another NFC device.

An embodiment overcomes all or part of the disadvantages of known methods of near-field charge of a NFC device by another NFC device.

An embodiment provides a method wherein a time of beginning of a periodic step of activation of a near-field communication circuit of a first device, charged in near field by a second device, is adjusted according to a frequency of an electromagnetic field emitted by the second device.

According to an embodiment, the frequency of the electromagnetic field emitted by the second device is estimated by counting oscillation periods of the electromagnetic field.

According to an embodiment, the counting is performed during all or part of a periodic step of deactivation of the near-field communication circuit of the first device.

According to an embodiment, the frequency of the electromagnetic field emitted by the second device is estimated, by the first device, periodically during the step of deactivation of the near-field communication circuit of the first device.

According to an embodiment, an oscillation frequency of an oscillating circuit of the first device is calibrated according to each estimate of the frequency of the electromagnetic field emitted by the second device.

According to an embodiment, the near-field communication circuit of the first device is activated after a first number of oscillations of the oscillating circuit of the first device.

According to an embodiment, the oscillation frequency of the oscillating circuit of the first device is in the range from 10 kHz to 500 kHz, preferably in the range from 30 kHz to 300 kHz, more preferably equal to approximately 64 kHz.

According to an embodiment, the frequency of the electromagnetic field emitted by the second device is estimated, by the first device, all along the step of deactivation of the near-field communication circuit of the first device.

According to an embodiment, the near-field communication circuit of the first device is woken up if the estimated frequency comes out of a frequency range.

According to an embodiment, the frequency of the electromagnetic field emitted by the second device is equal to approximately 13.56 MHz.

According to an embodiment, the first device is placed in a low-consumption mode.

An embodiment provides a near-field communication device configured to implement the method such as described.

BRIEF DESCRIPTION OF THE DRAWINGS

The foregoing and other features and advantages of the present invention will be discussed in detail in the following non-limiting description of specific embodiments and implementation modes in connection with the accompanying drawings, in which.

Figure 1:
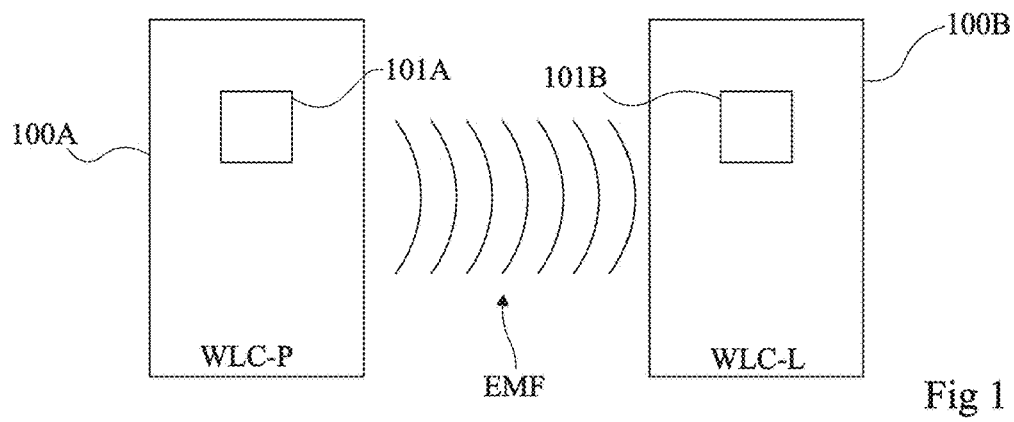
FIG. 1 schematically shows in the form of blocks an example of a near-field communication and charging system to which the described embodiments and implementation modes apply.

DETAILED DESCRIPTION OF ILLUSTRATIVE
EMBODIMENTS

Like features have been designated by like references in the various figures. In particular, the structural and/or functional elements common to the different embodiments and implementation modes may be designated with the same reference numerals and may have identical structural, dimensional, and material properties.

For clarity, only those steps and elements which are useful to the understanding of the described embodiments and implementation modes have been shown and will be detailed. In particular, the generation of the radio frequency signals and the interpretation thereof have not been detailed, the described embodiments and implementation modes being compatible with usual techniques of generation and interpretation of such signals.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

Unless specified otherwise, the expressions "around", "approximately", "substantially" and "in the order of" signify within 10%, and preferably within 5%.

In the present description, the term NFC device designates an electronic device integrating at least one near-field communication circuit (NFC).

FIG. 1 schematically shows an example of a near-field communication system of the type to which the described embodiments and implementation modes apply.

In the shown example, a first NFC device 100A (WLC-P) is likely to communicate, by near-field electromagnetic coupling, with a second NFC device 100B (WLC-L). According to applications, for a communication, one of NFC devices 100A, 100B operates in so-called reader mode while the other NFC device 100B, 100A operates in so-called card mode, or the two NFC devices 100A and 100B communicate in peer-to-peer mode (P2P).

Each NFC device 100A, 100B integrates, for example, a near-field communication circuit symbolized, in FIG. 1, by a block 101, 101B. Near-field communication circuits 101A and 101B for example each comprise various elements or electronic circuits for generating or detecting a radio frequency signal by means of an antenna (not shown), for example, modulation or demodulation circuits. During a communication between NFC devices 100A and 100B, the radio frequency signal generated by one of NFC devices 100A, 100B is for example captured by the other NFC device 100B, 100A located within its range.

In the shown example, it is assumed that NFC device 100A emits an electromagnetic field (EMF) to initiate a communication with NFC device 100B. The EMF field is for example captured by second NFC device 100B as soon as it is within its range. A coupling then forms between two oscillating circuits, in the case in point that of the antenna of NFC device 100A and that of the antenna of NFC device 100B. This coupling for example results in a variation of the load formed by the circuits of NFC device 100B on the oscillating circuit for generating the EMF field of NFC device 100A.

For a communication, a corresponding phase or amplitude variation of the emitted field is for example detected by device 100A, which then starts a protocol of NFC communication with device 100B. On the side of NFC device 100A, it is for example detected whether the amplitude of the voltage across the oscillating circuit and/or the phase shift with respect to the signal generated by circuit 101A come out of amplitude and/or phase ranges each delimited by thresholds.

In the case of a communication, once NFC device 100A has detected the presence of NFC device 100B in its field, it starts a procedure for establishing a communication, for example implementing transmissions of requests by NFC device 100A and of responses by NFC device 100B (polling sequence such as defined in the NFC Forum specifications).

Applications for example aim at taking advantage of the EMF field to implement data exchanges between NFC devices 100A and 100B.

Other applications for example rather aim at taking advantage of the EMF field to implement power exchanges between NFC devices 100A and 100B. Generally, this for example corresponds to a case where device 100B has an electric power source (not shown), for example a battery, capable of being charged by NFC device 100A. This for example more particularly corresponds to a case where NFC device 100A is a mobile terminal, for example a cell phone or a touch pad, and where NFC device 100B is a connected object, for example a connected watch, a connected bracelet, a pair of wireless headphones, a digital pen, etc. In this case, NFC device 100A for example has a battery of greater capacity than that of NFC device 100B.

As an example, in the case where NFC device 100A is used to charge NFC device 100B, NFC device 100A is a wireless charging poller (WLC-P) and NFC device 100B is a wireless charging listener (WLC-L). In this case, NFC devices 100A and 100B for example implement a wireless power transfer (WPT) such as defined in the NFC Forum specifications.

More particularly, the power transfer between NFC device 100A and NFC device 100B for example comprises the implementation of a wireless charging control protocol (WLC control protocol) such as defined in the NFC Forum specifications. Among wireless charging control protocols, protocols called static (Static WLC control protocol) and protocols called dynamic or negotiated (Negotiated WLC control protocol) can in particular be distinguished.

In a case where NFC device 100A implements a protocol of static wireless charge control of NFC device 100B, NFC device 100A for example continuously emits electromagnetic field EMF without transmitting data to NFC device 100B. In this case, NFC device 100A for example only transmits a carrier, of frequency f_EMF equal to approximately 13.56 MHz, with no frequency or amplitude modulation.

In another case where NFC device 100A implements a negotiated protocol of wireless charge control of NFC device 100B, NFC device 100A for example continuously emits electromagnetic field EMF and periodically transmits messages to NFC device 100B. In this case, NFC device 100A for example transmits the carrier, of frequency f_EMF equal to approximately 13.56 MHz, and for example periodically performs a modulation of this carrier to transmit the messages to NFC device 100B. As a response to the messages from NFC device 100A, other messages may be transmitted by NFC device 100B to NFC device 100A.

Generally, the messages transmitted by NFC device 100A to NFC device 100B for example comprise data relative to the charging of NFC device 100B by NFC device 100A. More particularly, these data for example define a capability of wireless charging (WLC_CAP) of NFC device 100B by NFC device 100A. As an example, the data comprise information of power and duration of the charging of NFC device 100B by NFC device 100A. Periodic exchanges of messages between NFC device 100A and NFC device 100B for example enable to regularly verify that NFC device 100B still needs being charged and, if so, to adjust the charging power and duration.

In the following description, it is for example considered that NFC devices 100A and 100B implement a negotiated wireless charging protocol.

Figure 2:
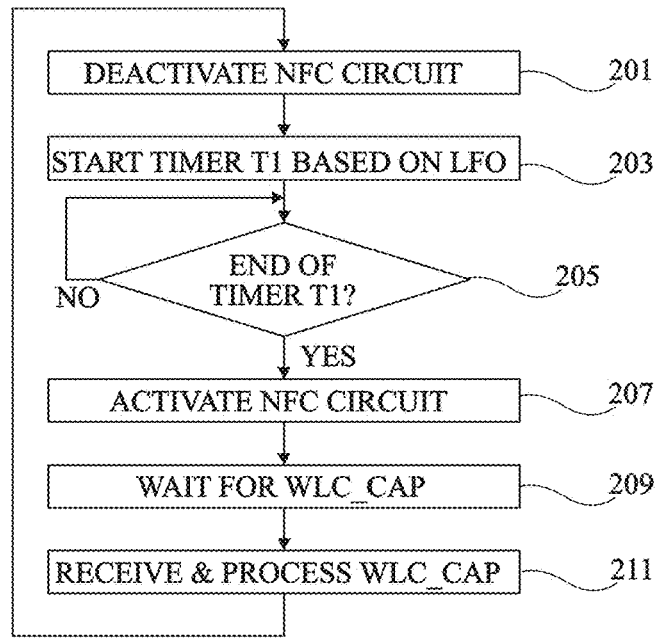
FIG. 2 partially and schematically shows in the form of blocks an example of a method of near-field charge of a device by another device.

FIG. 2 partially and schematically shows in the form of blocks an example of a method of near-field charge of a device, for example, the NFC device 100B of FIG. 1, by another device, for example, the NFC device 100A of FIG. 1.

In the shown example, during an operation of near-field charging of NFC device 100B by NFC device 100A, NFC device 100A periodically transmits messages WLC_CAP to NFC device 100B. To be able to receive and process each message WLC_CAP originating from NFC device 100A, the method provides periodic steps of activation of the near-field communication circuit 101B of NFC device 100B. Each of these periodic steps of activation of circuit 101B, having a duration D_ON, starts before the reception of a message WLC_CAP by NFC device 100B and stops after the processing of message WLC_CAP by NFC device 100B.

Between the periodic steps of activation of the near-field communication circuit 101B of NFC device 100B, the method further provides periodic steps of deactivation of circuit 101B. Each of these periodic steps of deactivation of circuit 101B, having a duration D_OFF, enables to decrease the power consumption of NFC device 100B during the charge. In particular, all or part of nearfield communication circuit 101B may for example be deactivated during duration D_OFF to decrease the electric power consumption of NFC device 100B. Circuits (not shown) for example intended to demodulate the electromagnetic field EMF emitted by NFC device 100A may in particular be deactivated during duration D_OFF.

During the charge of NFC device 100B by NFC device 100A, the near-field communication circuit 101B of NFC device 100B is thus alternately activated during duration D_ON and deactivated during duration D_OFF.

More particularly, at a step 201 (DEACTIVATE NFC CIRCUIT), the near-field communication circuit 101B of NFC device 100B is deactivated.

At another step 203 (START TIMER T1 BASED ON LFO), subsequent to step 201, a timer T1 is started. Timer T1 for example uses an oscillating circuit (not shown in FIG. 1), for example, a low-frequency oscillator (LFO) of NFC device 100B. From step 203, it is for example started to count oscillation periods of the oscillating circuit of NFC device 100B.

At still another step 205 (END OF TIMER T1?), subsequent to step 203, it is controlled whether duration D_OFF has elapsed. For this purpose, a number N of oscillations of circuit 101B since the beginning of step 203 is compared with another number N_OFF of oscillations of circuit 101B theoretically corresponding to duration D_OFF. In a case where duration D_OFF has not elapsed (output NO of step 205), it is then continued to count oscillation periods of the oscillating circuit until number N is equal to the number N_OFF corresponding to duration D_OFF. Once number N_OFF has been reached (output YES of step 205), that is, once duration D_OFF has elapsed, it is then proceeded to another step 207.

At step 207 (ACTIVATE NFC CIRCUIT), subsequent to step 205, the near-field communication circuit 101B of NFC device 100B is activated.

At still another step 209 (WAIT FOR WLC_CAP), subsequent to step 207, NFC device 100B waits for the reception of a message transmitted by NFC device 100A. At step 209, circuit 101B is for example ready to receive a message WLC_CAP from NFC device 100A.

At still another step 211 (RECEIVE & PROCESS WLC_CAP), subsequent to step 209, NFC device 100B receives and then processes the message WLC_CAP transmitted by NFC device 100A.

As an example, steps 201 to 211 are for example repeated until NFC device 100B has been totally charged by NFC device 100A. In particular, at each repetition of step 211, NFC device 100A verifies that NFC device 100B is still present and still need being charged, and then adjusts the charging duration and power.

Figure 3:
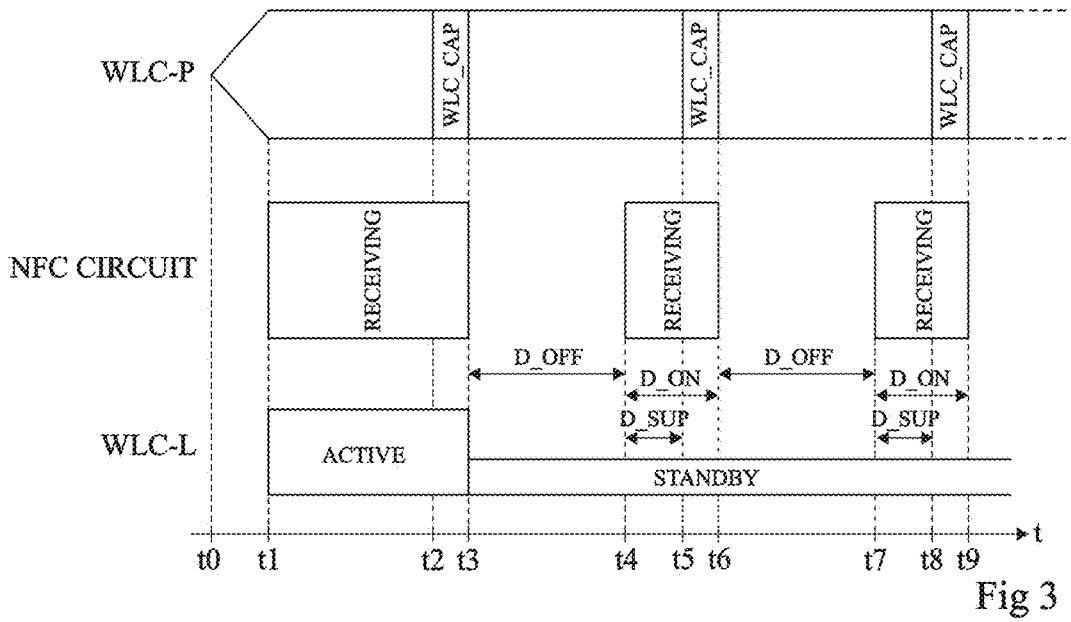
FIG. 3 is a timing diagram illustrating an example of application of the near-field charge method of FIG. 2 to the system of FIG. 1.

FIG. 3 is a timing diagram illustrating an example of application of the near-field charging method of FIG. 2 to the system of FIG. 1.

At a time t0, for example marking the beginning of an operation of charge of NFC device 100B (WLC-L) by NFC device 100A (WLC-P), NFC device 100A starts the emission of electromagnetic field EMF.

At a time t1, subsequent to time t0 and for example corresponding to a time when field EMF reaches a nominal value, the near-field communication circuit 101B (NFC CIRCUIT) of NFC device 100B is activated (RECEIVING). At time t1, NFC device 100B is for example in an active state (ACTIVE), for example, a state where a microprocessor (not shown in FIG. 1) of NFC device 100B is powered on.

At a time t2, subsequent to time t1, NFC device 100A starts the transmission of a first message (WLC_CAP). Near-field communication circuit 101B being activated, NFC device 100B receives and then processes the first message WLC_CAP.

At a time t3, subsequent to time t2, the processing of the first message WLC_CAP by NFC device 100B ends. In the shown example, near-field communication circuit 101B is then deactivated, and NFC device 100B is further switched to the low-consumption mode (STANDBY).

At a time t4, subsequent to time t3 and separated from time t3 by duration D_OFF, near-field communication circuit 101B is reactivated (RECEIVING). In the shown example, NFC device 100B is maintained in the low-consumption mode.

At a time t5, subsequent to time t4, NFC device 100A starts the transmission of a second message (WLC_CAP). Near-field communication circuit 101B being activated, NFC device 100B receives and then processes the second message WLC_CAP.

At a time t6, subsequent to time t5 and separated from time t4 by duration D_ON, the processing of the second message WLC_CAP by NFC device 100B ends. The near-field communication circuit 101B of NFC device 100B is deactivated.

At a time t7, subsequent to time t6 and separated from time t6 by duration D_OFF, near-field communication circuit 101B is reactivated (RECEIVING).

At a time t8, subsequent to time t7, NFC device 100A starts the transmission of a third message (WLC_CAP). Near-field communication circuit 101B being activated, NFC device 100B receives and then processes the third message WLC_CAP.

At a time t9, subsequent to time t8 and separated from time t7 by duration D_ON, the processing of the third message WLC_CAP by NFC device 100B ends. The near-field communication circuit 101B of NFC device 100B is deactivated.

In the example of the method discussed in relation with FIGS. 2 and 3, the duration D_OFF of each step of deactivation of circuit 101B corresponds to the number N_OFF of periods of oscillation, at a substantially constant frequency f_LFO, of the oscillating circuit of NFC device 100B. As an example, the oscillation frequency f_LFO of the oscillating circuit of NFC device 100B is in the range from 10 kHz to 500 kHz, preferably in the range from 30 kHz to 300 kHz, more preferably equal to approximately 64 kHz.

To optimize the power efficiency and to decrease the duration of charge of NFC device 100B by NFC device 100A, it is advantageous to make sure that the time t4, t7 of activation of circuit 101B is as close as possible to the time t5, t8 of message WLC_CAP by NFC device 100A.

However, the oscillating circuit used to activate circuit 101B at the end of duration D_OFF generally exhibits a frequency inaccuracy. The inaccuracy of the oscillating circuit is for example due to manufacturing dispersions of this circuit. As an example, this inaccuracy is at most in the order of ±15% of the theoretical frequency of the oscillating circuit, that is, of the frequency f_LFO at which the circuit has been designed to operate.

As an example, if the real frequency of the oscillating circuit is smaller than its theoretical frequency f_LFO, the number N_OFF of oscillations then corresponds to a duration greater than duration D_OFF. However, if the real frequency of the oscillating circuit is greater than its theoretical frequency f_LFO, the number N_OFF of oscillations then corresponds to a duration smaller than duration D_OFF.

To avoid risking activating circuit 101B too late, that is, after the beginning of the transmission of one of messages WLC_CAP, circuit 101B is parameterized by taking into account, for example, an unfavorable case where the oscillating circuit would have a frequency inaccuracy of +15%. In the shown example, this leads to providing, between times t4 and t5 and between times t7 and t8, an additional duration or time interval D_SUP enabling to ensure that circuit 101B will be activated to receive messages WLC_CAP despite the inaccuracy of the oscillating circuit. Duration D_SUP for example corresponds to a number N_SUP of oscillations of the oscillating circuit. However, the activation of circuit 101B during each duration D_SUP has the disadvantage of causing an unwanted power consumption adversely affecting the efficiency and the duration of the charge of NFC device 100B.

To overcome this problem, an oscillating circuit having a lower frequency inaccuracy, for example, in the order of ±1%, could be used. However, this would have the disadvantage of causing a cost increase of the NFC device 100B integrating the oscillating circuit.

Figure 4:
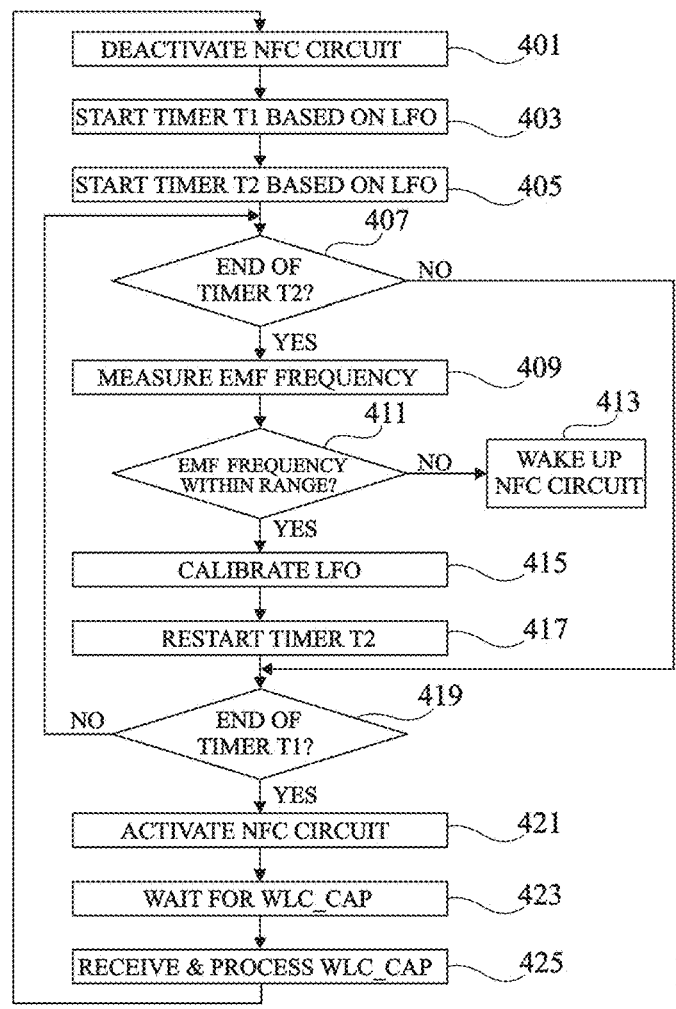
FIG. 4 partially and schematically shows in the form of blocks an implementation mode of a method of near-field charge of a device by another device.

FIG. 4 partially and schematically shows in the form of blocks an implementation mode of a method of near-field charging of a device, for example, the NFC device 100B of FIG. 1, by another device, for example, the NFC device 100A of FIG. 1.

According to this implementation mode, the beginning of the periodic step of activation of the near-field communication circuit 101B of NFC device 100B is adjusted according to the frequency f_EMF of the electromagnetic field EMF emitted by NFC device 100A. The frequency f_EMF of electromagnetic field EMF is for example measured a plurality of times, for example, periodically, during each step of deactivation of circuit 101B. As an example, the frequency f_EMF of electromagnetic field EMF is equal to approximately 13.56 MHz, plus or minus 7 kHz.

More particularly, at a step 401 (DEACTIVATE NFC CIRCUIT), the near-field communication circuit 101B of NFC device 100B is deactivated.

At another step 403 (START TIMER T1 BASED ON LFO), subsequent to step 401, timer T1 is started. From step 403, it is for example started to count oscillation periods of the oscillating circuit of NFC device 100B. As an example, the number N of oscillation periods of the oscillating circuit since the beginning of step 403 is recorded into a memory (not shown) of NFC device 100B.

At still another step 405 (START TIMER T2 BASED ON LFO), subsequent to step 403, another timer T2 is started. Timer T2 is for example based on an oscillating circuit of NFC device 100B, for example, the same oscillating circuit as for timer T1. From step 405, it is for example started to count oscillation periods of the oscillating circuit of NFC device 100B. As an example, another number N1 of oscillations of the oscillating circuit since the beginning of step 405 is recorded into the memory of NFC device 100B.

At still another step 407 (END OF TIMER T2?), subsequent to step 405, it is controlled whether timer T2 has elapsed. As an example, the number N1 of oscillations of the oscillating circuit since the beginning of step 405 is compared with another number N_D1 of oscillations theoretically corresponding to a duration D1. In a case where duration D1 has elapsed (output YES of step 407), that is, if number N1 is equal to number N_D1, it is proceeded to still another step 409 (MEASURE EMF FREQUENCY).

At step 409, the frequency f_EMF of the electromagnetic field EMF emitted by NFC device 100A is estimated. As an example, oscillations of electromagnetic field EMF are counted during a duration D2.

At still another step 411 (EMF FREQUENCY WITHIN RANGE?), subsequent to step 409, it is verified whether electromagnetic field EMF is still within range of the NFC device 100B to be charged. It is for example controlled at step 411 whether the frequency f_EMF estimated at step 409 is within a frequency range reflecting the presence of the NFC device 100A emitting field EMF within range. As an example, it is controlled whether the frequency f_EMF estimated at step 409 is equal to 13.56 MHz, to within more or less 7 kHz.

In a case where the frequency f_EMF estimated at step 409 is not within the frequency range (output NO of step 411), it is then proceeded to a step 413 (WAKE UP NFC CIRCUIT) of waking up of circuit 101B. In this case, circuit 101B for example informs the microprocessor of NFC device 100B that field EMF is out of range and the charge method is interrupted.

However, in a case where the frequency f_EMF estimated at step 409 is within the frequency range (output YES of step 411), it is then proceeded to a step 415 (CALIBRATE LFO).

At step 415, subsequent to step 409, the result of the estimation of the frequency f_EMF of field EMF is used to calibrate the oscillation frequency f_LFO of the oscillating circuit of NFC device 100B. As an example, another number N2 of oscillations of field EMF during an oscillation period of the oscillating circuit is compared to trace back the real oscillation frequency of the oscillating circuit. The oscillating circuit is then calibrated, for example, by readjusting its operating frequency with respect to the obtained frequency estimate.

At still another step 417 (RESTART TIMER T2), subsequent to step 415, timer T2 is restarted, after which is it proceeded to still another step 419 (END OF TIMER T1?).

However, in a case where duration D1 has not elapsed (output NO of step 407) at step 407, that is, if number N1 is smaller than number N_D1, it is directly proceeded to step 419.

At step 419, it is for example verified whether timer T1 has elapsed. As an example, the number N of oscillations of the oscillating circuit of NFC device 100B since the beginning of step 403 is compared with the number N_OFF of periods theoretically corresponding to duration D_OFF. In a case where duration D_OFF has not elapsed (output NO of step 419), that is, if number N is smaller than number N_OFF, it is returned to step 407.

However, in a case where duration D_OFF has elapsed (output YES of step 419), that is, if number N is equal to number N_OFF, it is then proceeded to another step 421 (ACTIVATE NFC CIRCUIT).

At step 412, the near-field communication circuit 101B of NFC device 100B is activated.

At still another step 423 (WAIT FOR WLC_CAP), subsequent to step 421, NFC device 100B waits for the reception of a message transmitted by NFC device 100A. At step 423, circuit 101B is for example ready to receive a message WLC_CAP from NFC device 100A.

At still another step 425 (RECEIVE & PROCESS WLC_CAP), subsequent to step 423, NFC device 100B receives and then processes the message WLC_CAP transmitted by NFC device 100A.

Once message WLC_CAP has been processed by NFC device 100B, it is for example returned to step 401 of deactivation of the near-field communication circuit 101B of NFC device 100B.

It is for example ascertained that step 409 of estimation of the frequency f_EMF of electromagnetic field EMF and step 415 of calibration of the oscillating circuit of NFC device 100B are carried out a plurality of times during each period of deactivation of circuit 101B. As an example, the duration D1 separating two consecutive estimates of the frequency f_EMF of field EMF is equal to approximately 1 ms. As an example, the duration D2 for which the oscillations of field EMF are counted is equal to approximately 40 μs.

In the method described in relation with FIG. 4, the verification of the presence of field EMF performed at step 411 is performed a plurality of times, periodically, during periods of deactivation of circuit 101B. This advantageously enables to inform a user of NFC device 100B, within a short delay following the disappearing of field EMF, that the charge of NFC device 100B is interrupted. The user experience is thus improved, particularly as compared with a case where the information of interruption of the charge of NFC device 100B would be displayed during periods of activation of circuit 101B only, for example by observing a lack of reception of the message WLC_CAP supposed to be transmitted by NFC device 100A.

As an example, steps 405 to 417 are implemented by a finite state machine (FSM) of NFC device 100B.

Figure 5:
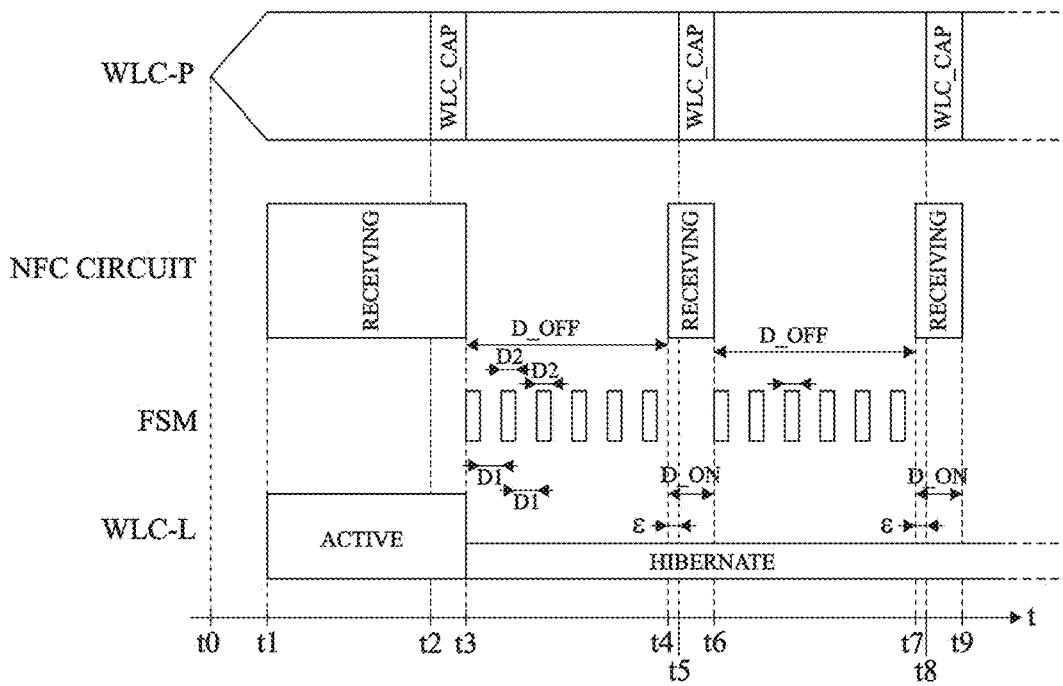
FIG. 5 is a timing diagram illustrating an example of application of the near-field charge method of FIG. 4 to the system of FIG. 1.

FIG. 5 is a timing diagram illustrating an example of application of the near-field charging method of FIG. 4 to the system of FIG. 1.

At a time t0, for example marking the beginning of an operation of charge of NFC device 100B (WLC-L) by NFC device 100A (WLC-P), NFC device 100A starts the emission of electromagnetic field EMF.

At a time t1, subsequent to time t0 and for example corresponding to a time when field EMF reaches a nominal value, the near-field communication circuit 101B (NFC CIRCUIT) of NFC device 100B is activated (RECEIVING). At time t1, NFC device 100B is for example in an active state (ACTIVE), for example, a state where a microprocessor of NFC device 100B is powered on.

At a time t2, subsequent to time t1, NFC device 100A starts the transmission of a first message (WLC_CAP). Near-field communication circuit 101B being activated, NFC device 100B receives and then processes the first message WLC_CAP.

At a time t3, subsequent to time t2, the processing of the first message WLC_CAP by NFC device 100B ends. In the shown example, near-field communication circuit 101B is then deactivated, and NFC device 100B is further switched to a low-consumption mode (HIBERNATE). In this low-consumption mode, the microprocessor of NFC device 100B is for example turned off and there is no retention of information in memories of NFC device 100B.

At a time t4, subsequent to time t3 and separated from time t3 by duration D_OFF, near-field communication circuit 101B is reactivated (RECEIVING). In the shown example, NFC device 100B is maintained in the low-consumption mode.

In the shown example, during the duration D_OFF separating times t3 and t4, six operations of estimation of the frequency f_EMF of the field EMF emitted by NFC device 100A and six calibrations of the frequency of the oscillating circuit are performed by the state machine (FSM) of NFC device 100B.

At a time t5, subsequent to time t4 and separated from time t4 by duration D_ON, NFC device 100A starts the transmission of a second message (WLC_CAP). In the shown example, duration D_ON corresponds to a duration for which circuit 101B is waiting for the reception of the second message WLC_CAP. Near-field communication circuit 101B being activated at time t5, NFC device 100B receives and then processes the second message WLC_CAP.

At a time t6, subsequent to time t5, the processing of the second message WLC_CAP by NFC device 100B ends. At the end of the processing of second message WLC_CAP, the near-field communication circuit 101B of NFC device 100B is deactivated.

At a time t7, subsequent to time t6 and separated from time t6 by duration D_OFF, near-field communication circuit 101B is reactivated (RECEIVING).

In the shown example, during the duration D_OFF separating times t6 and t7, six operations of estimation of the frequency f_EMF of the field EMF emitted by NFC device 100A and six calibrations of the frequency of the oscillating circuit are performed by the state machine (FSM) of NFC device 100B. This example is however not limiting, those skilled in the art being capable of adapting the number of operations of estimation of the frequency f_EMF of field EMF during each duration D_OFF according to the application.

At a time t8, subsequent to time t7, NFC device 100A starts the transmission of a third message (WLC_CAP). Near-field communication circuit 101B being activated, NFC device 100B receives and then processes the third message WLC_CAP.

At a time t9, subsequent to time t8 and separated from time t7 by duration D_ON, the processing of the third message WLC_CAP by NFC device 100B ends. The near-field communication circuit 101B of NFC device 100B is deactivated.

In the shown example, the near-field communication circuit 101B of NFC device 100B is activated just before the reception of each message WLC_CAP. More particularly, the time t4, t7 of activation of circuit 101B is separated from the time t5, t8 of reception of message WLC_CAP by a duration c shorter than the duration D_SUP of FIG. 3. The duration D_ON for which circuit 101B is activated is thus decreased and the duration D_OFF for which circuit 101B is deactivated is thus increased.

An advantage of the method discussed hereabove in relation with FIGS. 4 and 5 lies in the fact that the periodic calibration of the oscillating circuit of NFC device 100B enables to decrease the power consumption of NFC device 100B during the charging operation.

Figure 6:
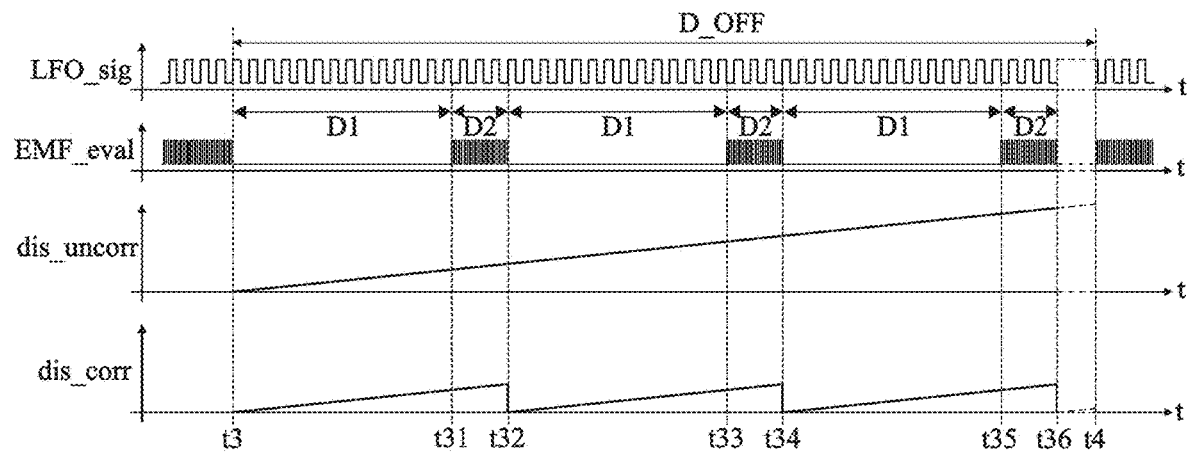
FIG. 6 is a timing diagram illustrating in more detailed fashion a portion of the example of application of the near-field charge method of FIG. 4 to the system of FIG. 1.

FIG. 6 is a timing diagram illustrating in more detailed fashion a portion of the example of application of the near-field charge method of FIG. 4 to the system of FIG. 1. More particularly, FIG. 6 details the operations performed between times t3 and t4 of the timing diagram of FIG. 5.

FIG. 6 comprises:

a first graph illustrating an example of variation, over time t, of an oscillating signal LFO_sig generated by the oscillating circuit of NFC device 100B;

a second graph illustrating an example of variation, over time t, of a signal EMF_eval corresponding to the estimation, by NFC device 100B, of the electromagnetic field EMF emitted by NFC device 100A;

a third graph illustrating an example of variation, over time t, of a frequency drift dis_uncorr of the oscillating circuit of NFC device 100B in a case where no calibration is performed during duration D_OFF of deactivation of circuit 101B; and a fourth graph illustrating an example of variation, over time t, of a frequency drift dis_corr of the oscillating circuit of NFC device 100B in a case corresponding to an implementation mode providing performing periodic calibrations during duration D_OFF.

In the shown example, at time t3, circuit 101B is deactivated and stops estimating the frequency f_EMF of field EMF. From time t3, the oscillation frequency f_LFO of the oscillating circuit starts drifting, for example constantly increasing.

At a time t31, subsequent to time t3 and separated from time t3 by duration D1, circuit 101B starts the estimation of the frequency f_EMF of field EMF.

At a time t32, subsequent to time t31 and separated from time t31 by duration D2, the estimation of the frequency f_EMF of field EMF is stopped. Oscillation frequency f_LFO is then calibrated, which enables to correct or to compensate for the frequency drift of the oscillating circuit as shown in the fourth graph. However, if no calibration was performed, the frequency drift of the oscillating circuit would keep on varying after time t32, as shown in the third graph.

At a time t33, subsequent to time t32 and separated from time t32 by duration D1, a new estimation of the frequency f_EMF of field EMF is performed.

At a time t34, subsequent to time t33 and separated from time t33 by duration D2, the estimation of the frequency f_EMF of field EMF is stopped. Oscillation frequency f_LFO is then calibrated again, which enables to correct or to compensate for the frequency drift of the oscillating circuit, as shown in the fourth graph. However, if no calibration was performed, the frequency drift of the oscillating circuit would keep on varying after time t34, as shown in the third graph.

The operations described hereabove in relation with times t33 and t34 are then repeated at respective times t35 and t36.

In the shown example, the implementation of the method of periodic calibration of the oscillating circuit of device 100B enables to obtain, at time t4 of activation of circuit 101B, a frequency drift smaller than that which would be obtained with no calibration.

An implementation mode of a method where the frequency f_EMF of the electromagnetic field EMF emitted by NFC device 100B is periodically measured has been described hereabove in relation with FIGS. 4, 5, and 6. This implementation mode proves to be particularly advantageous in a case where messages WLC_CAP are emitted periodically by NFC device 100A at a low frequency, for example, when two successive messages WLC_CAP are separated by a duration ranging from a few seconds to a few minutes.

As a variant, it may be provided for the frequency f_EMF of electromagnetic field EMF to be permanently measured during duration D_OFF of deactivation of circuit 101B. This variant proves to be particularly advantageous in a case where messages WLC_CAP are periodically emitted by NFC device 100A at a high frequency, for example, when two successive messages WLC_CAP are separated by a duration ranging from a few milliseconds to a few hundreds of milliseconds. The adaptation of the described implementation modes to this variant is within the abilities of those skilled in the art based on the above indications. In particular, those skilled in the art are capable of providing a step similar to the step 411 of the method discussed in relation with FIG. 4 to verify the presence of the field EMF within range and, in a case where it would be concluded that field EMF is out of range, cause a waking up of circuit 101B.

Figure 7:
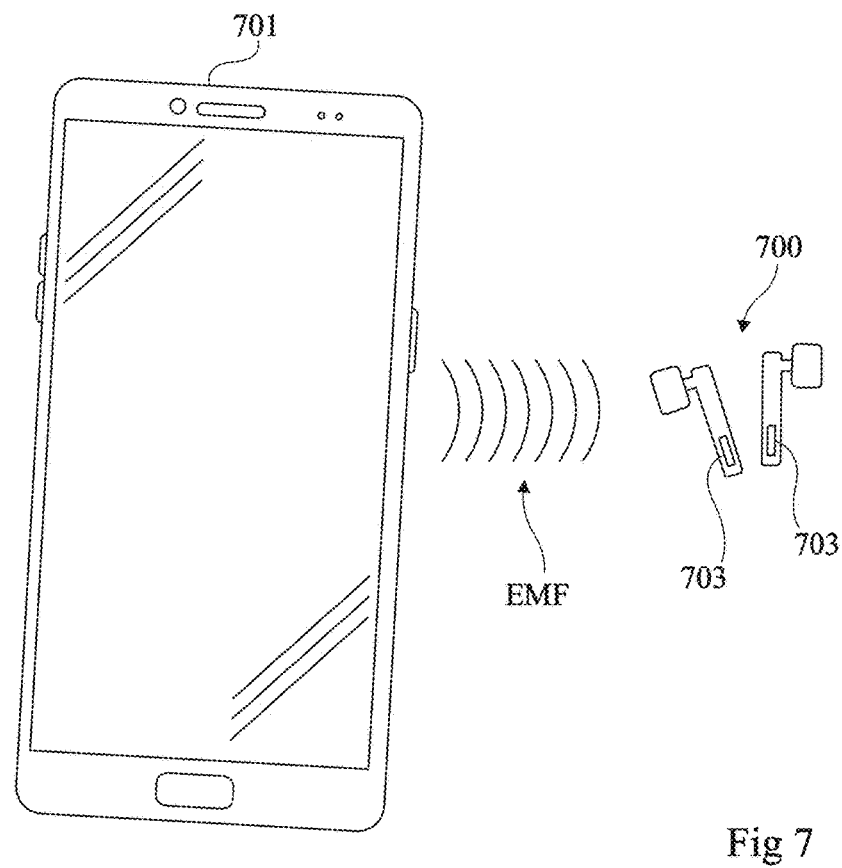
FIG. 7 shows an example of application of the described embodiments and implementation modes to a charge of a connected object by a cell phone.

FIG. 7 shows an example of application of the described embodiments and implementation modes to a charging of a connected object 700 by a cell phone 701. In the shown example, connected object 700 is a pair of wireless headphones.

The implementation of the method described hereabove in relation with FIGS. 4, 5, and 6 particularly enables to optimize the power efficiency of the wireless charge, by cell phone 701, of batteries 703 embedded in wireless headphones 700. More particularly, the implementation of this method for example enables to decrease the time of charge of batteries 703 via electromagnetic field EMF.

Various embodiments and variants have been described. Those skilled in the art will understand that certain features of these various embodiments and variants may be combined, and other variants will occur to those skilled in the art. In particular, although examples of application where messages WLC_CAP are transmitted at constant intervals by NFC device 100A, it will be within the abilities of those skilled in the art to adapt the described implementation modes to a case where messages WLC_CAP are transmitted at non-constant intervals.

Finally, the practical implementation of the described embodiments and variants is within the abilities of those skilled in the art based on the functional indications given hereabove. In particular, the frequency at which the calibration of the oscillating circuit is performed may be adjusted according to the application.

What is claimed is:

1. A method of operating a first device, the method comprising:

adjusting a time of beginning of a periodic step of activation of a near-field communication circuit of the first device, charged in near field by a second device, according to a frequency of an electromagnetic field emitted by the second device.

2. The method according to claim 1, further comprising estimating the frequency of the electromagnetic field emitted by the second device by counting oscillation periods of the electromagnetic field.

3. The method according to claim 2, further comprising performing the counting during all or part of a periodic step of deactivation of the near-field communication circuit of the first device.

4. The method according to claim 3, further comprising estimating, by the first device, the frequency of the electromagnetic field emitted by the second device periodically during the step of deactivation of the near-field communication circuit of the first device.

5. The method according to claim 4, further comprising waking up the near-field communication circuit of the first device in response to the estimated frequency coming out of a frequency range.

6. The method according to claim 3, further comprising estimating, by the first device, the frequency of the electromagnetic field emitted by the second device all along the step of deactivation of the near-field communication circuit of the first device.

7. The method according to claim 2, further comprising calibrating an oscillating frequency of an oscillating circuit of the first device according to each estimated frequency of the electromagnetic field emitted by the second device.

8. The method according to claim 7, further comprising activating the near-field communication circuit of the first device after a first number of oscillations of the oscillating circuit of the first device.

9. The method according to claim 7, wherein the oscillation frequency of the oscillating circuit of the first device is in a range from 10 kHz to 500 kHz.

10. The method according to claim 1, wherein the frequency of the electromagnetic field emitted by the second device is approximately 13.56 MHz.

11. The method according to claim 1, further comprising placing the first device in a low-consumption mode.

12. A first device comprising:
a near-field communication circuit; and
a processor configured to adjusting a time of beginning of a periodic step of activation of the near-field communication circuit, charged in near field by a second device, according to a frequency of an electromagnetic field emitted by the second device.

13. The first device according to claim 12, wherein the processor is configured to estimate the frequency of the electromagnetic field emitted by the second device by counting oscillation periods of the electromagnetic field.

14. The first device according to claim 13, wherein the processor is configured to perform the counting during all or part of a periodic step of deactivation of the near-field communication circuit.

15. The first device according to claim 14, wherein the processor is configured to estimate the frequency of the electromagnetic field emitted by the second device periodically during the step of deactivation of the near-field communication circuit.

16. The first device according to claim 15, wherein the processor is configured to wake up the near-field communication circuit in response to the estimated frequency coming out of a frequency range.

17. The first device according to claim 14, wherein the processor is configured to estimate the frequency of the electromagnetic field emitted by the second device all along the step of deactivation of the near-field communication circuit.

18. The first device according to claim 13, wherein the processor is configured to calibrate an oscillating frequency of an oscillating circuit according to each estimated frequency of the electromagnetic field emitted by the second device.

19. The first device according to claim 18, wherein the processor is configured to activate the near-field communication circuit after a first number of oscillations of the oscillating circuit.

20. The first device according to claim 18, wherein the oscillation frequency of the oscillating circuit is in a range from 10 kHz to 500 kHz.

21. The first device according to claim 12, wherein the frequency of the electromagnetic field emitted by the second device is approximately 13.56 MHz.

22. The first device according to claim 12, wherein the processor is configured to place the first device in a low-consumption mode.

* * * * *